No. 868,898. PATENTED OCT. 22, 1907.
W. A. WERCKLE.
CORN SEPARATOR.
APPLICATION FILED MAR. 27, 1905.
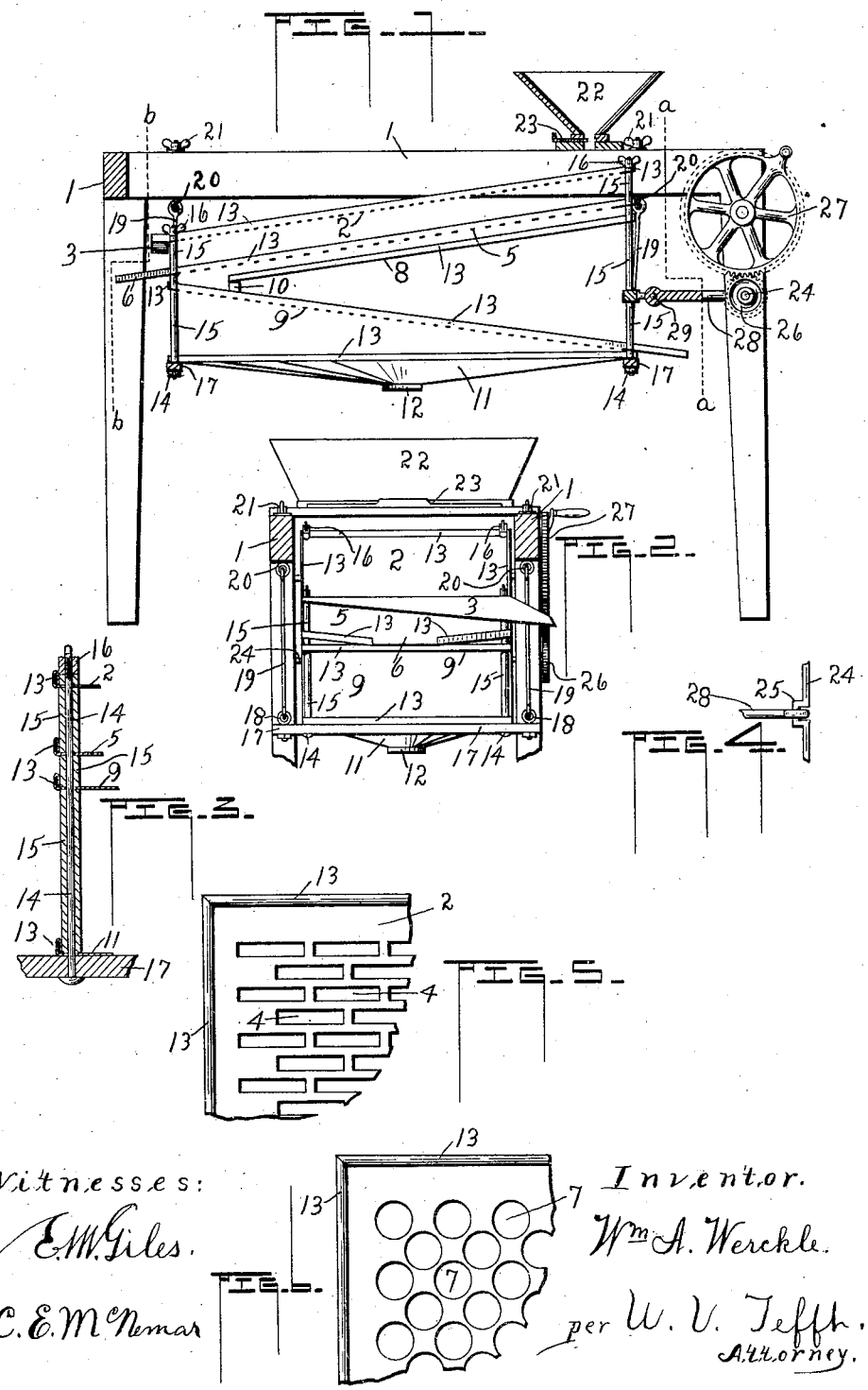
Witnesses:
E. W. Giles.
C. E. McNemar
Inventor.
Wm A. Werckle.
per W. V. Tefft.
Attorney.

UNITED STATES PATENT OFFICE.

WILLIAM A. WERCKLE, OF PEORIA, ILLINOIS.

CORN-SEPARATOR.

No. 868,898.  Specification of Letters Patent.  Patented Oct. 22, 1907.

Application filed March 27, 1905. Serial No. 252,222.

*To all whom it may concern:*

Be it known that I, WILLIAM A. WERCKLE, a citizen of the United States, residing at Peoria, in the county of Peoria and State of Illinois, have invented certain new and useful Improvements in Corn-Separators; and I do hereby declare that the following is a full, clear, and exact description of the invention, which will enable others skilled in the art to which it appertains to make and use the same.
This invention has relation more particularly to machines for separating corn into different grades, according to its shape and size, by passing it through a series of riddles.

The object of my invention is to provide a simple and effective means whereby corn can be so separated as to give a grade of corn of a common size and shape suitable for planter use.

Modern corn-planters are so constructed that for satisfactory operation they require that the grains of corn used therein be of a uniform size and of the flat variety found on the middle portion of the cob, and it has also been demonstrated that sorted corn of this character makes a better yield.

My invention provides for sorting or separating corn so that a grade of this nature can be obtained, as will be further seen in the following specification, by reference to the accompanying drawings, in which;

Figure 1 is a view from the side of my machine, the portion at the left of line *a—a* being a section through the center. Fig. 2 is an end view of my machine, that portion of the supporting frame at the left of line *b—b* of Fig. 1 being cut away. Fig. 3 is a detail view of my method of joining the riddles together. Fig. 4 is a detail view of the double crank and the pitman which vibrates the riddle frame. Figs. 5 and 6 are portions of the two kinds of riddles used.

All the riddles and accessory parts thereto are joined together, forming what I call the "riddle frame" which is loosely supported by the rectangular frame 1 in such a manner as to be capable of longitudinal vibratory movement. The first riddle 2 of this riddle frame, upon which the corn first falls and by which it is first screened, is inclined as shown so that the corn, on account of the slant, will readily slide toward the bottom of the riddle which terminates in the inclined gutter or spout 3, which deposits its contents at the side of the machine. This riddle is constructed of sheet metal and has perforations 4 approximately one quarter of an inch wide by three quarters of an inch long, extending crosswise of the said riddle and arranged as shown in Fig. 5. The riddle 5 is directly underneath and parallel to the riddle 2 and terminates in the end spout 6 which is formed by converging the sides thereof. This riddle is made of sheet metal and has round perforations 7 as shown in Fig. 6, which are approximately three eighths of an inch in diameter. Directly underneath this riddle 5 and parallel therewith is the plain, unperforated surface 8 which extends to within a short distance of the end of the riddle frame so as to collect the corn which drops through riddle 5 and convey it to the upper part of the next riddle 9 which is inclined in the opposite direction. The lower edge of this conveyer 8 is supported by means of a raised bridge 10 supported by the riddle 9 and extending from side to side thereof.
The next riddle 9 is similar to riddle 5, the perforations therein being about five-sixteenths of an inch in diameter, or somewhat smaller than those in riddle 5. Directly underneath the riddle 9 is the bottom 11 of the riddle frame, which is formed in the shape of a flattened hopper and converges to the opening 12, so that all the corn which drops through the riddle 9 will be collected by the bottom 11 and discharged through the opening 12. Instead of inclosing these riddles and accessory parts in a box as is done in many machines of this character, I surround all the parts upon which the corn drops and slides with the edges 13 so as to prevent the corn from spilling off the sides, and hold the said parts of the riddle frame together by means of rods 14 with sections of tubing 15 telescoping the said rods between the various parts to properly space them, and secure these parts on the rods by the thumb nuts 16 which have a threaded connection with the upper ends of the said rods. With this construction the riddle frame can easily be taken apart and the operator has access to all the parts during operation.

Extending laterally across under each end of the riddle frame are the strips 17, which are securely fastened to the said riddle frame by the bolts or rods 14. The ends of these strips extend a short distance beyond the riddle frame at each side and have the eyes 18 on the upper surface to which the lower ends of the hangers 19 are fastened. The upper ends of the hangers 19 are secured to the loops of the bolts 20, which said bolts pass through the frame 1 and are secured thereto by means of the thumb nuts 21.

Removably supported on the frame 1 above the upper end of the riddle 2 is the hopper 22 which is provided with the slide 23 for regulating and shutting off the supply of corn.

For the purpose of vibrating the riddle frame longitudinally on its hangers, I provide the crank shaft 24 with a double crank 25, which said shaft is journaled to some portion of the supporting frame 1 at one end so as to be capable of revolution, and a pinion 26 on one end of the crank shaft engaged by the gear wheel 27 provides for rapid revolution of the crank shaft and the connecting rod 28 secured to the double crank 25 and to a portion of the riddle frame as at 29 provides for longitudinal vibration of the riddle frame at every revolution of the crank shaft 24.

From the foregoing description, the operation of my machine will be seen to be as follows: Corn of irregular sizes and shapes falling from the hopper 22 falls onto the upper end of riddle 2, the large round grains rolling and the flat grains sliding downward. The flat grains, when they strike a slot, tip up on edge and under the influence of the vibration of the riddle, drop through, as will also the small grains, while the large round grains roll on down over the slots and into the inclined gutter 3 and from thence pass out at the side of the machine. The corn that has passed through the riddle 2 falls on the riddle 5, which has round perforations, through which the largest of the flat grains cannot pass so these large flat grains pass out through the spout 6. The corn that drops through the perforations in 5, which consists of the medium flat and all the small round grains falls onto the conveyer 8 and is carried to the upper part of riddle 9 down which it slides. This riddle having smaller perforations than riddle 5 takes out all the very small flat grains and the small round grains which drop through and onto the bottom 11; and pass out through the opening 12. The remainder on the riddle 9, which are the medium flat grains are discharged from the spout thereof. This as can be seen, takes out by means of riddle 2 all the large round grains and by means of the riddle 9 all the small flat and round grains, and gives two grades of corn suitable for planter use; one grade, the deposit from the spout 6, of large flat grains, and the other grade, the deposit from the spout of riddle 9, of medium flat grains.

This machine as can be seen is simple, easily operated, and very effective, and much more rapid than any method at present known to the inventor.

I am aware that numerous separating machines have been constructed for screening various seeds and grains, composed of elements similar to those which I employ, but I am not aware of a corn separator in which riddles are employed and I am not aware of a separator in which the riddles are put together in a skeleton frame.

Having thus fully described my invention, what I claim and desire to secure by Letters Patent of the United States, is:

The combination, in a corn separator, of an inclined, transversely slotted riddle terminating in a side discharging gutter, a second riddle, with round perforations, directly underneath and parallel with the said slotted riddle and terminating in a spout, a conveyer surface directly underneath and parallel with the said second riddle and extending to within a short distance of the upper end of the third riddle, upon which it deposits, the said third riddle inclined in the opposite direction to the second riddle, terminating in a spout and having smaller perforations than the said second riddle, a bridge on the third riddle to support the discharge end of the aforesaid conveyer, a flattened hopper shaped bottom directly underneath the said third riddle, rods connecting the said riddles, conveyer, and bottom, sections of tubing on the rods between the said riddles, conveyer, and bottom, telescoping the said rods, hangers depending from a supporting frame and secured to the lower portion of the complete riddle frame, a hopper depositing on the upper end of the first riddle, and a revoluble double crank connected with the riddle frame, substantially as and for the purposes specified.

In testimony whereof I have affixed my signature, in presence of two witnesses.

WILLIAM A. WERCKLE.

Witnesses:
E. M. GILES,
MARY E. COMEGYS.